Dec. 11, 1923.

E. V. KAUFFMAN 1,477,061

SWIVELED TRACTOR PLOWHITCH

Filed Nov. 18, 1921

Inventor
E. V. Kauffman
By William J. Jacobi
Attorney

Patented Dec. 11, 1923.

1,477,061

UNITED STATES PATENT OFFICE.

EARL V. KAUFFMAN, OF CABLE, OHIO.

SWIVELED TRACTOR PLOWHITCH.

Application filed November 18, 1921. Serial No. 516,108.

*To all whom it may concern:*

Be it known that EARL V. KAUFFMAN, a citizen of the United States, residing at Cable, in the county of Champaign and State of Ohio, has invented certain new and useful Improvements in Swiveled Tractor Plowhitches, of which the following is a specification.

This invention relates to a tractor plow hitch and particularly to a swiveled hitch connecting the tractor and the plow.

The principal object of my invention is to provide a swiveled hitch or connection which will permit the plow or other agricultural implement which is being drawn by the tractor to have an oscillating movement with respect to the latter so that the said plow or implement may accommodate itself to various irregularities in the surface of the ground without transmitting like movement to the tractor or vice versa.

The invention therefore contemplates a hitch which will avoid strain or twisting of any rigid connection between the tractor and plow.

Referring to the accompanying drawing forming a part of the specification:

Figure 1:
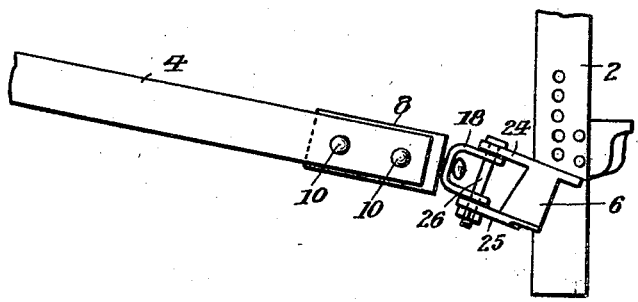
Figure 1 is a side elevation of my swiveled hitch, and showing its relation to the plow beam and a rigid part of the tractor.

Referring now more specifically to the drawings, in which the reference characters denote like parts throughout the several Figures, 2 designates the depending rigid draft bar of a tractor of ordinary construction, such, for instance, as the "Moline Universal" placed upon the market by the Moline Plow Co., and 4 indicates the beam of a plow or other agricultural implement which the tractor is intended to draw, 6 indicating the yoke which is supported by said draft bar 2 and which in the usual construction is connected with the implement beam.

Figure 2:
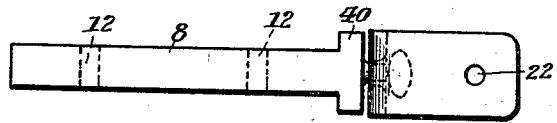
Figure 2 is a top plan view of the hitch detached.
Figure 3:
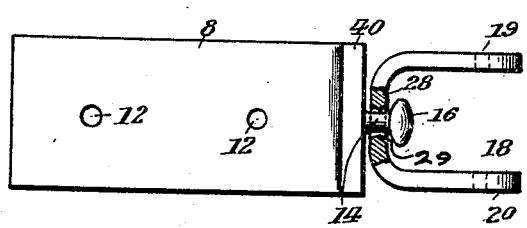
Figure 3 is a side elevation of the hitch detached.
Figure 4:
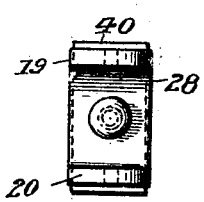
Figure 4 is an end view of the hitch as shown in Figure 3, and looking in the direction of the arrow.

My construction departs from the usual form, in that it provides a swiveled connection between the yoke 6 and the beam 2, and to this end, as shown more clearly in Figures 2 and 3, I provide a beam plate 8 which is secured to the beam 2 through the medium of bolts 10 which pass through registering apertures 12 in the plate 8 and in the beam, the forward end of said plate being formed with a T-shaped head 40 which not only reinforces the end, but provides lateral bearing portions or flanges for a purpose to be described.

Integral with the beam plate 2, and projecting forwardly from the end thereof, centrally of its height, is a pin 14 having a rounded head 16.

Cooperating with the headed pin 14 is a clevis 18, having forwardly projecting arms 19 and 20 having registering apertures 22, through which, and registering apertures in upper and lower rearwardly projecting arms 24 and 25 of the yoke 6 passes a kingpin 26, which permits the clevis to swing laterally.

The transverse portion 28 of the clevis is provided with a central aperture 29, the walls of which flare outwardly from the center toward each side, this aperture accommodating the pin 14, the head 16 of which is of greater area than said aperture and lies within the clevis, this construction permitting the latter to swing or rock in any direction with respect to the plow beam, and also to oscillate on the axis of the said pin 14.

The T-shaped head of the beam plate affords upper and lower and lateral bearing surfaces for the base or transverse portion of the clevis during relative movement between the latter and the beam.

Having thus described my invention what I claim as new is:

1. A swiveled plow hitch comprising a beam plate having a T-shaped head providing lateral bearing flanges, a clevis having an opening centrally in the base thereof whose walls flare outwardly toward each side of said base, a pin integral with and projecting forwardly from said T-shaped head, said pin passing loosely through said opening, said pin having a rounded head lying within the confines of said clevis and of greater area than that of said opening.

2. A swiveled plow hitch comprising a beam plate having a T-shaped head providing lateral bearing flanges, a clevis provided with a central opening in the base thereof, a pin integrally formed with said T-shaped head and extending through said opening, said opening having its walls flared outwardly from the center thereof to permit oscillation between said clevis and pin, and a head formed on the free end of said pin disposed within the confines of said clevis, and of greater diameter than that of the aforesaid opening, whereby to limit the movement of said clevis with respect to the beam plate.

In testimony whereof I affix my signature.

EARL V. KAUFFMAN.